United States Patent
Noguchi

[19]

[11] Patent Number: 6,104,689
[45] Date of Patent: Aug. 15, 2000

[54] SENSOR SYSTEM FOR OPTICAL DISC DRIVE

[75] Inventor: Masato Noguchi, Saitama-ken, Japan

[73] Assignee: Asahi Kogaku Kogyo Kabushiki Kaisha, Tokyo, Japan

[21] Appl. No.: 09/120,369

[22] Filed: Jul. 22, 1998

[30] Foreign Application Priority Data

| Jul. 22, 1997 | [JP] | Japan | 9-211370 |
| Jul. 22, 1997 | [JP] | Japan | 9-211371 |
| Jul. 22, 1997 | [JP] | Japan | 9-211372 |
| Jul. 21, 1998 | [JP] | Japan | 10-205621 |

[51] Int. Cl.$^7$ .................................................. G11B 7/09
[52] U.S. Cl. .................. 369/112; 103/44.12; 103/44.23; 103/44.41
[58] Field of Search ............................ 369/44.23, 44.12, 369/44.14, 44.41, 44.42, 112, 103, 109

[56] References Cited

U.S. PATENT DOCUMENTS

| 4,724,533 | 2/1988 | Ohara et al. . | |
| 4,998,235 | 3/1991 | Ishibashi et al. . | |
| 5,278,401 | 1/1994 | Takishima et al. . | |
| 5,365,504 | 11/1994 | Noguchi . | |
| 5,406,532 | 4/1995 | Nishikawa . | |
| 5,500,849 | 3/1996 | Noguchi . | |
| 5,535,179 | 7/1996 | Noguchi . | |
| 5,636,190 | 6/1997 | Choi | 369/44.23 |
| 5,774,443 | 6/1998 | Shibano | 369/103 |
| 5,894,464 | 4/1999 | Kim et al. | 369/103 |
| 5,903,529 | 5/1999 | Nishi et al. | 369/44.23 |

*Primary Examiner*—Muhammad Edun
*Attorney, Agent, or Firm*—Greenblum & Bernstein, P.L.C.

[57] ABSTRACT

Disclosed is a sensor system for an optical disc drive. The sensor system is provided with a collective lens, a beam splitting element that divides the light beam received and emerged by the collective lens into at least two beams in a first direction, a first and a second sensor for receiving the beams divided by the beam splitter. A focusing error signal is generated, based on output signals of each of light receiving areas of the first and second sensors, in accordance with a difference of sizes of spots formed on the first and second sensors.

20 Claims, 13 Drawing Sheets

— TRACKING ERROR SIGNAL
···· FOCUSING ERROR SIGNAL

— FIRST SENSOR
···· SECOND SENSOR

— FIRST SENSOR
···· SECOND SENSOR

— FIRST SENSOR
····· SECOND SENSOR

— FIRST SENSOR
····· SECOND SENSOR

1st HOLOGRAM

2nd HOLOGRAM

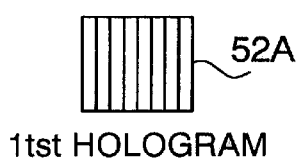
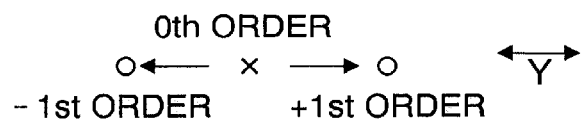
FIG. 22A     FIG. 22B
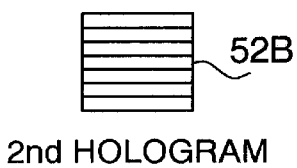
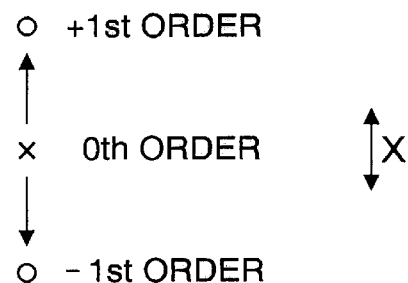
FIG. 22C     FIG. 22D
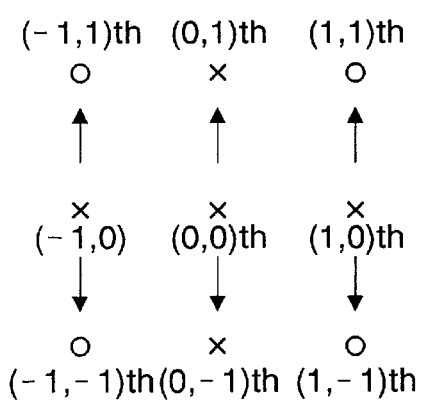
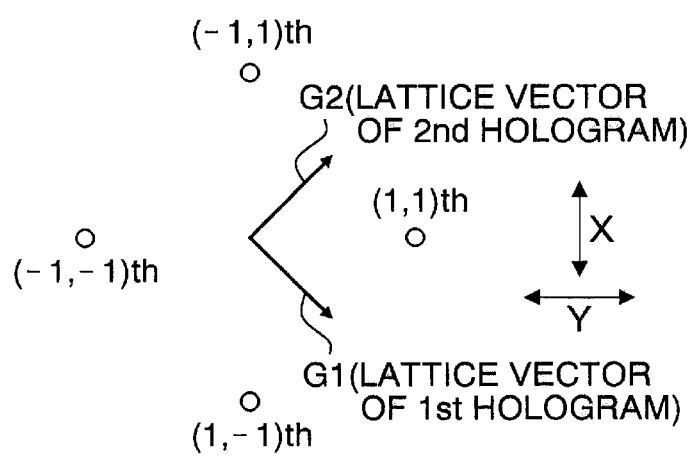
FIG. 23     FIG. 24

|G1| ≠ |G2|

|G1|=|G2|

1st HOLOGRAM : ± m- th ORDER BEAM
2nd HOLOGRAM : ± n- th ORDER BEAM
m · |G1|=n · |G2|

SENSOR SYSTEM FOR OPTICAL DISC DRIVE

BACKGROUND OF THE INVENTION

The present invention relates to a sensor system employed in an optical disc drive for detecting a focusing error signal using a spot size detection method.

An optical system of an optical disc drive utilizing an optical disc, a magneto-optical disc or the like as a recording medium is generally provided with a laser source for emitting a laser beam, an objective lens for converging the laser beam on the recording medium to form a beam spot thereon, and a sensor system for receiving a beam reflected by the recording medium to detect a data signal, a focusing error signal and a tracking error signal.

A spot size detection method is conventionally used for detecting the focusing error signal. To perform the spot size detection method, the sensor system is provided with a collective lens for receiving and converging the reflected light beam, a hologram element which is inserted within the optical path of the converging beam to split the beam into two beams in a predetermined direction, and a first and a second sensors arranged in the predetermined direction for receiving the respective beams split by the hologram element.

The first and second sensors are arranged such that one of the sensors is located closer to the collective lens than a converging point of a beam incident thereon, and the other sensor is located farther from the collective lens than a converging point of the beam incident thereon.

An example of such a configuration will be described below. The hologram element divides an incident beam into a +1st diffraction light beam and a −1st diffraction light beam in a first direction. Further, the hologram element functions as a positive lens for the +1st order diffraction light beam, and as a negative lens for the −1st order diffraction light beam. With this constitution, the +1st order diffraction light and the −1st order diffraction light are converged at different positions having different distances from the hologram. The +1st order diffraction light is received by the first sensor which is arranged farther from the collective lens than the converging point of the +1st order diffraction light beam. The −1st order diffraction light is received by the second sensor which is arranged closer to the collective lens than the converging point of the −1st order diffraction light beam. In this configuration, 0th order light beam is not utilized (i.e., not received by the first and second sensors).

The sizes of the beam spots formed on the first and the second sensors change depending on a focusing condition of the objective lens. Therefore, by detecting a difference in size of the beam spots on the first and second sensors, the focusing error signal indicative of the focusing condition of the objective lens can be detected.

In this specification, directions with respect to orientation of sensors will be indicated by directions X and Y. The direction X and the direction Y are defined as follows.

(a) Direction X: the direction X corresponds to a radial direction of the disc at a point where a beam spot is formed and reflected (i.e., a relationship between the direction X with respect to the beam spot formed on a sensor is similar to a relationship between a radial direction of the optical disc with respect a point at which the beam spot is formed); and (b) Direction Y: the direction Y corresponds to a direction tangential to a track of the disc at a point where a beam spot is formed and reflected (i.e., a relationship between the direction Y with respect to the beam spot formed on a sensor is similar to a relationship between an extending direction of a tangential line to a track of the disc at a point where a beam spot is formed).

In addition to the above, in order to obtain a tracking error signal based on the signals output by the first and second sensors, the hologram element may be formed to split an incident beam in the first direction.

For example, as shown in FIG. 1, the first and second sensors area arranged in the X direction, substantially symmetrical with respect to a 0th order light beam, and each of the first and second sensors has four light receiving areas (first sensor: areas A–D; second sensor: areas E–H) which are divided by lines extending in the Y direction.

The focusing error signal FE and a tracking error signal TE are represented by the equations below:

$$FE = Sa - Sb - Sc + Sd - Se + Sf + Sg - Sh;$$

and $$TE = Sa + Sb - Sc - Sd - Se - Sf + Sg + Sh,$$

where, signals output from the areas A–H are represented by Sa–Sh, respectively.

In the above-described conventional sensor system, however, when the beam spot formed on the disc moves in a transversal direction of the tracks of the disc when data search or the like is performed, even if the objective lens focuses on the disc (i.e., even if there is no focusing error), changes of brightness occur at a central portion, in the X direction, of the spots on the first and second sensors, and the focusing error signal may fluctuate.

FIG. 2 shows a graph indicating changes of the tracking error signal (solid line, $1/10$ scale) and the focusing error signal (broken line) when the beam spot on the disc moves from a center of a land ($X'=0$) to a next land ($X'=1$) using an objective lens whose NA (numerical aperture) is 0.6, a collective lens whose focal length is 27 mm, and sensor systems shown in FIG. 1. In the graph, $X'=0.5$ represents a center of a groove which is formed between adjacent lands.

As shown in FIG. 2, when the spot on the disc moves in the radial direction ($X'$) of the disc, the focusing error signal, which should have a flat characteristic on the graph, contains a noise component. In this specification, the noise component included in the focusing error signal which is generated when the spot is moved in the radial direction of the disc is referred to as a T/F (Tracking/Focusing) cross-talk. The T/F cross-talk appears as brightness change at a predetermined area on the spot formed on the sensors.

SUMMARY OF THE INVENTION

It is therefore an object of the invention to provide an improved sensor system for an optical disc drive capable of removing the T/F cross-talk when the spot size detection method is employed for detecting a focusing error signal.

A further object of the invention is to provided a sensor system with which a tracking error signal can be obtained as well as a focusing error signal without including noise component therein.

For the above objects, according to the present invention, there is provided a sensor system for an optical disc drive, which is provided with a collective lens that receives and converges a light beam reflected by an optical disc, a beam splitting element that divides the light beam received and emerged by the collective lens into at least two beams in a first direction, the first direction corresponding to a direction tangential to a track of the optical disc at a position where the light beam is reflected, a first sensor provided to receive one of the at least two beams, the first sensor being arranged at a position farther from the collective lens than a converging point of the one of at least two beams, the first sensor having a plurality of light receiving areas and a non-sensitive area extending in the first direction at a central portion in a second direction which is perpendicular to the first direction, the second direction corresponding to a radial direction of the optical disc at a position where the light beam is reflected, a second sensor provided to receive another of the at least two beams, the first sensor being arranged at a position closer to the collective lens than a converging point of the another of at least two beams, the second sensor having a plurality of light receiving areas and a non-sensitive area extending in the first direction at a central portion in the second direction which is perpendicular to the first direction. A focusing error signal is generated, based on output signals of each of light receiving areas of the first and second sensors, in accordance with a difference of sizes of spots formed on the first and second sensors.

In particular, a width of each of the non-sensitive areas in the second direction may be greater than a distance in the second direction of adjacent light receiving areas.

Preferably, a width, in the second direction, of the non-sensitive area of each of the first and second sensors substantially coincides with a width, in the second direction, of a cross-talk area at which relationship of brightnesses on the first and second sensors change when a beam spot formed on the optical disc moves in a transverse direction of tracks of the optical disc when there is no focusing error.

Further, boundaries of the plurality of light receiving areas of each of the first and second sensors extend in the first direction.

Optionally, a tracking error signal is generated based on a difference between signals of light receiving areas on both sides of the non-sensitive area.

In particular, each of the first and second sensors includes two light receiving areas on either side of the non-sensitive area.

Further optionally, the beam splitter comprises a hologram element which divides an incident beam into ±n-th order diffraction light beams, the hologram element having one of positive and negative power for the +n-th order diffraction light beam and having the other of positive and negative power for the −n-th order diffraction light beam.

In this case, the hologram element may divide an incident beam into ±1st order diffraction light beams.

According to another aspect of the invention, there is provided a sensor system for an optical disc drive, which is provided with a collective lens that receives and converges a light beam reflected by an optical disc, a hologram element that divides a light beam emerged by the collective lens into at least a 0th order diffraction light beam and an n-th (n≠0) order diffraction light beam in a second direction, the hologram element having a predetermined power with respect to the n-th order diffraction light beam, the second direction corresponding to a radial direction of the disc at a point where the light beam is reflected, a first sensor provided to receive the 0th order diffraction light beam at a position apart from a converging point of the 0th order diffraction light beam, the first sensor having a plurality of light receiving areas which are divided by one boundary extending in a first direction, which is perpendicular to the second direction, at a center in the second direction and by at least two boundaries extending in the second direction, the first direction corresponding to a direction tangential to a track of the optical disc at a point where the light beam is reflected, a second sensor provided to receive the n-th order diffraction light beam at a position apart from a converging point of the n-th order diffraction light beam, the second sensor having a plurality of light receiving areas which are divided by at least two boundaries extending in the second direction, and a signal detection system which generates: (a) a focusing error signal based on output signals of each of light receiving areas of the first and second sensors, in accordance with a spot size detection method; and (b) a tracking error signal based on output signal of the light receiving areas of the first sensor, in accordance with a push-pull method.

In particular, the first sensor may be arranged at a position closer to the collective lens than the converging point of the 0th order diffraction light beam, and wherein the second sensor is arranged at a position farther from the collective lens than a converging point of the n-th order diffraction light beam.

Optionally, the first and second sensors are apart from a principal plane of the collective lens by the same distance.

Further, the hologram element may divide an incident beam into the 0th order diffraction light beam and +1st order diffraction light beam, the second sensor being positioned to receive the +1st order diffraction light beam.

According to a further aspect of the invention, there is provided a sensor system for an optical disc drive, which is provided with a collective lens that receives and converges a light beam reflected by an optical disc, a hologram element that divides a light beam emerged from the collective lens into at least a 0th order diffraction light beam and a ±n-th (n≠0) order diffraction light beams in a second direction corresponding to a radial direction of the disc at a point where the light beam is reflected, the hologram element having different powers with respect to the ±n-th order diffraction light beams, a first sensor provided to receive the 0th order diffraction light beam at a position apart from a converging point of the 0th order light beam, the first sensor having a plurality of light receiving areas which are divided, at a center in the second direction, by one boundary extending in a first direction corresponding to a direction tangential to a track of the disc at a point where the light beam is reflected, a second sensor provided to receive the +n-th order diffraction light beam at a position farther from the collective lens than a converging point of the +n-th order diffraction light beam, the second sensor having a plurality of light receiving areas which are divided by at least two boundaries extending in the second direction, a third sensor provided to receive the −n-th order diffraction light beam at a position closer to the collective lens than a converging point of the −n-th order diffraction light beam, the third sensor having a plurality of light receiving areas which are divided by at least two boundaries extending in the second direction, and a signal detection system that generates:

(a) a focusing error signal based on output signals of each of light receiving areas of the second and third sensors, in accordance with a spot size detection method, and (b) a tracking error signal based on output signals of the light receiving areas of the first sensor, in accordance with a push-pull method.

In particular, the first sensor is located at a position closer to the collective lens than the converging point of the 0th order diffraction light beam.

Further, distances from a principal plane of the collective lens to the first, second and third sensors are substantially the same.

Furthermore, the hologram is formed to generate 0th and ±1st order diffraction light beams, the second sensor being arranged to receive the +1st order diffraction light beam, and the third sensor being arranged to receive the −1st order diffraction light beam.

According to another aspect of the invention, there is provided with a hologram element for sensor system of an optical disc drive, the hologram element includes, a first hologram which has a first function (F1), the first function (F1) including a function of dividing an incident beam into a plurality of beams in a first direction, and a second hologram which has a second function (F2), the second function (F2) including a function of dividing an incident beam into a plurality of beams in a second direction which is different from the first direction, wherein the first and second hologram may satisfy a condition:

$$Fc = m \cdot F1 + n \cdot F2,$$

where Fc represents a function of providing a defocus, m and n are integers.

Optionally, the hologram may satisfy a condition:

$$m|G1| = n|G2|;$$

and $$G2 \neq k \cdot G1,$$

wherein, G1 represents a lattice vector of the first hologram, G2 represents a lattice vector of the second hologram, and k represents a real number.

Further optionally, the first hologram mainly generates ±m-th order diffraction light beams, and wherein the second hologram mainly generates ±n-th order diffraction light beams.

In particular, m and n respectively equal to 1 (one).

BRIEF DESCRIPTION OF THE ACCOMPANYING DRAWINGS

FIGS. 22A and 22B show a first hologram and its function as a modification of the hologram shown in FIG. 20A;

FIGS. 22C and 22D show a second hologram and its function as a modification of the hologram shown in FIG. 20C;

FIG. 23 shows a position of spots formed by beams divided by the hologram consisting of the first and second holograms shown in FIGS. 22A–22D;

FIG. 24 shows a chart illustrating an orientation of the hologram element consisting of the holograms shown in FIGS. 22A–22D;

DESCRIPTION OF THE EMBODIMENTS

Hereinafter, the invention will be described with reference to the accompanying drawings.

Firstly, a mechanism of generation of the T/F cross-talk will be described in detail. A simulation is performed to analyze the T/F cross-talk using the conventional sensor system described above.

Figure 3:
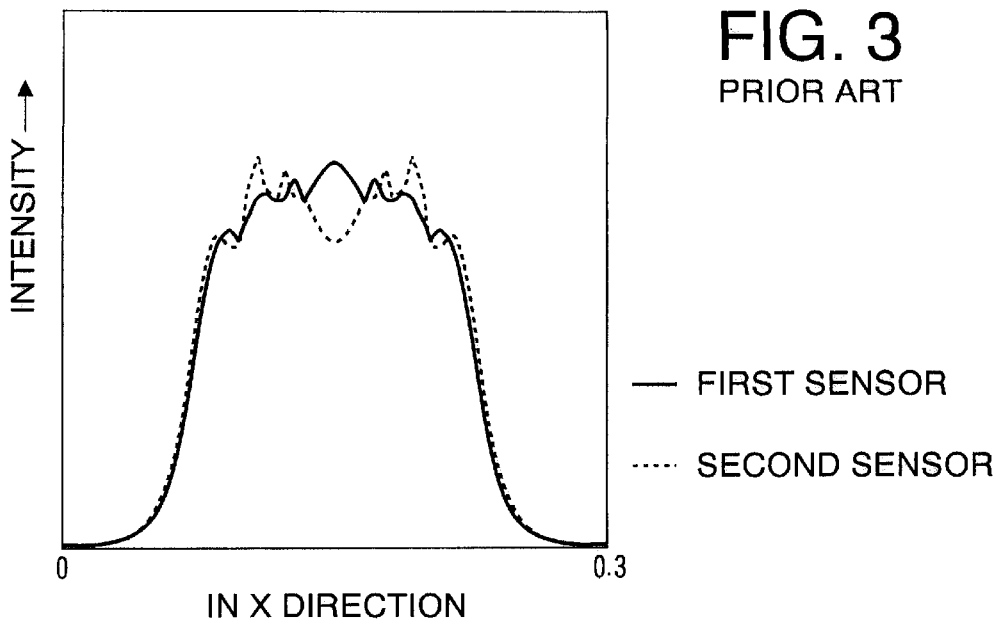
FIG. 3 shows an intensity distribution of a spot formed on a land of an optical disc, in a tangential direction thereof.
Figure 4:
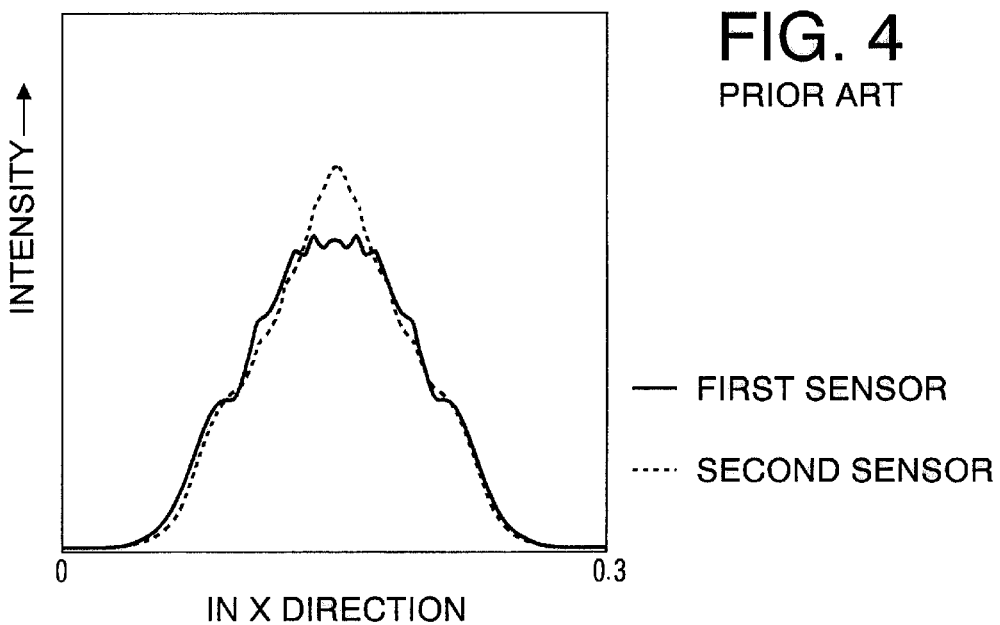
FIG. 4 shows an intensity distribution of a spot formed on a groove of the optical disc, in the tangential direction.

FIGS. 3 and 4 are graphs showing a simulation result indicative of light intensity distribution on the first and second sensors when the beam spot on a disc moves in the transversal direction of the tracks.

FIG. 3 shows the light intensity distribution when the spot on the disc is located at the center of the land. In FIG. 3, a solid line represents the distribution on the first sensor, and a broken line represents the distribution on the second sensor. FIG. 4 shows the light intensity distribution when the spot on the disc is located on a groove. In FIG. 4, a solid line and a broken line respectively represent intensity distributions of the first and second sensors.

From FIGS. 3 and 4, the followings are known.

Figure 5:
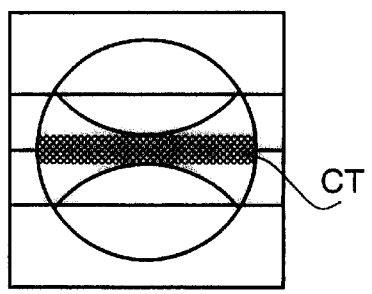
FIG. 5 shows a cross-talk area of a spot formed on a sensor.

An area at a central portion in the X direction and extending in the Y direction of the first sensor becomes brighter than the corresponding area of the second sensor when the spot on the disc is located at the center of the land. Further, the area of the first sensor becomes darker than the corresponding area of the second sensor when the spot on the disc is located at the center of the groove. Hereinafter, the area is referred to as a cross-talk area CT, which is indicated as a hatched portion in FIG. 5. It should be noted that the cross-talk area CT appears at a central portion of a spot in the X direction, and extends in the Y direction.

Figure 6:
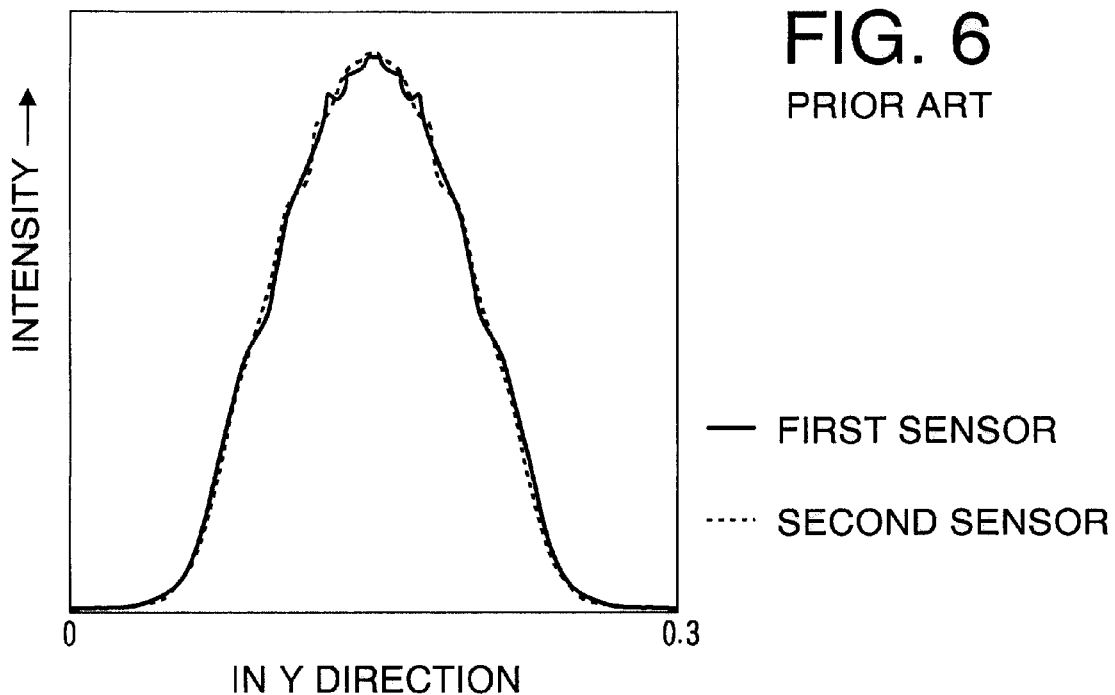
FIG. 6 shows an intensity distribution of a spot formed on a land of an optical disc, in a radial direction thereof.
Figure 7:
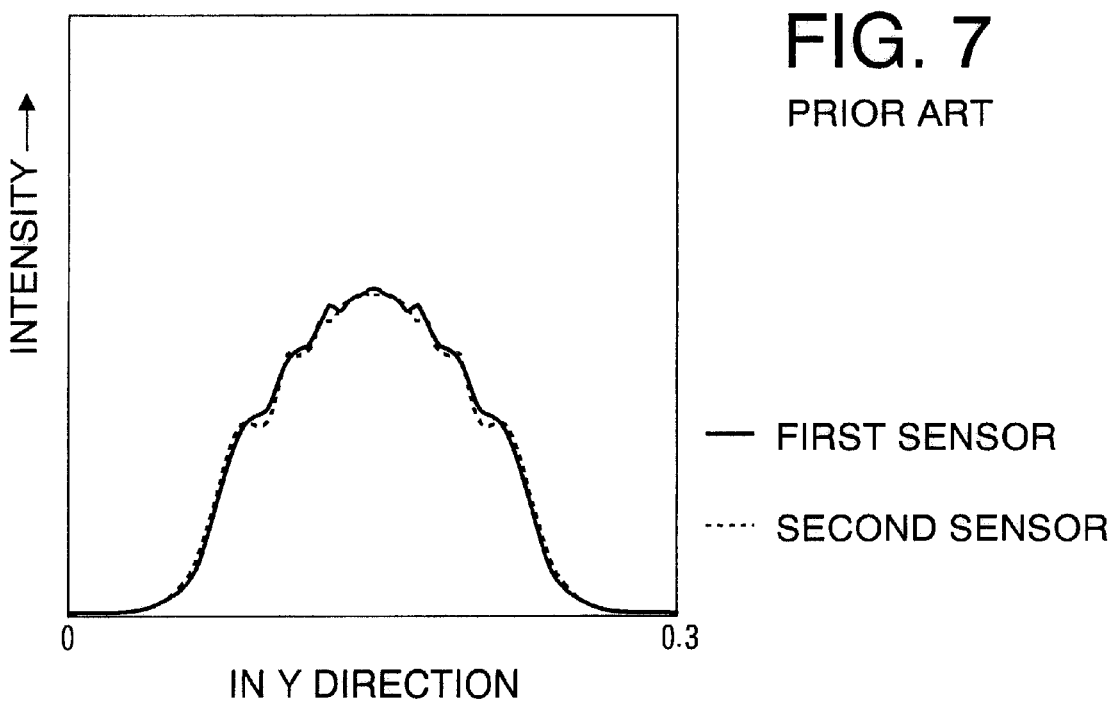
FIG. 7 shows an intensity distribution of a spot formed on a groove of the optical disc, in the radial direction.

FIGS. 6 and 7 are graphs showing simulation results representing the light intensity distribution in the direction Y on the first and second sensors. FIG. 6 shows the light intensity distribution when the spot on the disc is located at the center of the land. In FIG. 6, a solid line represents the distribution on the first sensor, and a broken line represents the distribution on the second sensor. The intensity is obtained by integrating received light amount within an effective area in the X direction for respective Y coordinates. FIG. 7 shows the distribution when the spot on the disc is located on a groove, a solid line and a broken line respectively representing intensity distributions on the first and second sensors.

As shown in FIGS. 6 and 7, in the direction Y, the intensity distributions on the first and second sensors are substantially the same, and the T/F cross-talk does not occur in the Y direction.

Figure 1:
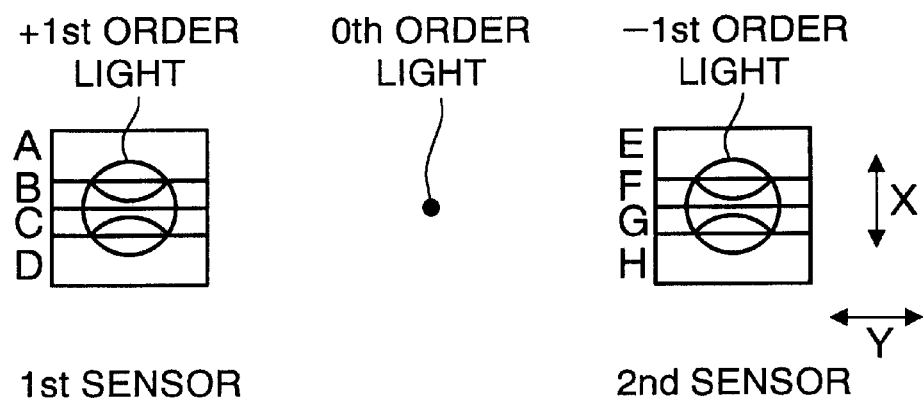
FIG. 1 shows an arrangement of sensors of a conventional sensor system for an optical disc drive.
Figure 2:
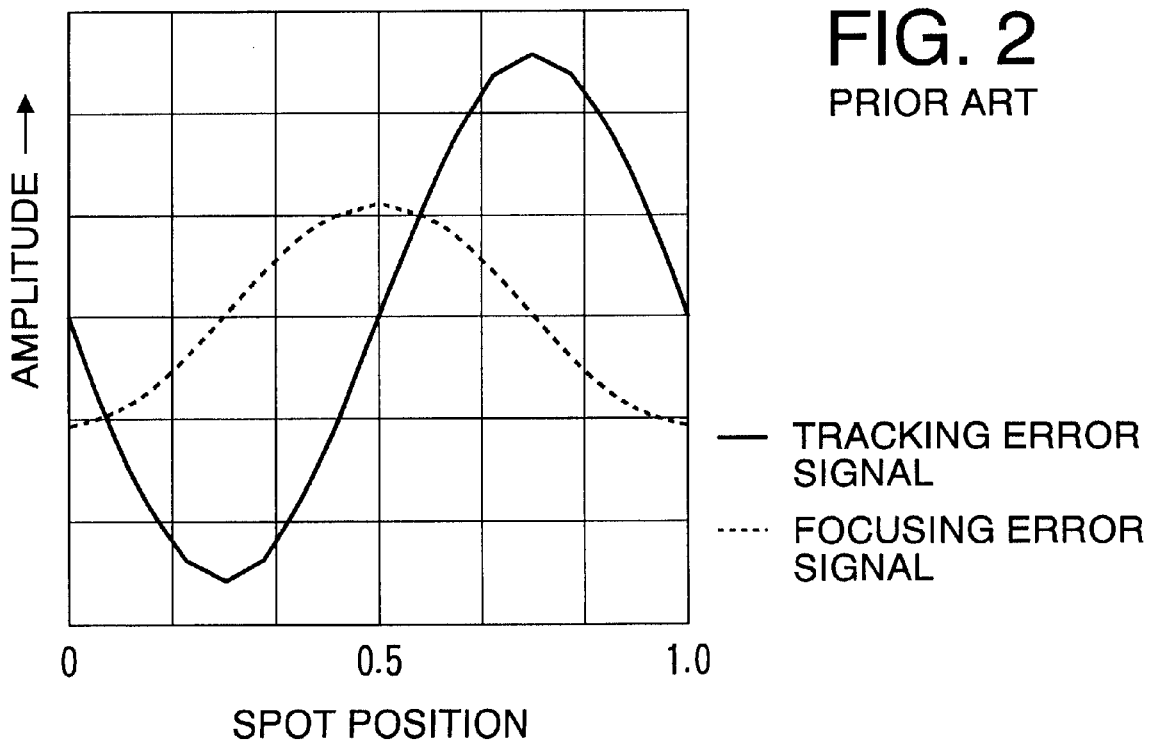
FIG. 2 is a graph showing intensity distribution of a focusing error signal and a tracking error signal detected by the conventional sensor system.

Therefore, if the boundaries of the light receiving areas A–H in FIG. 1 are changed to extend in the X direction, the T/F cross-talk can be removed. However, if the sensors are constituted in such a fashion, although the T/F cross-talk can be removed, it becomes impossible to obtain the tracking error signal. Further, a displacement of the spot on the sensors due to change of the wavelength of the beam generates a noise component.

Hereinafter, optical disc drives and sensor systems capable of removing the T/F cross-talk with allowing detection of the tracking error signal will be described in detail.

Firstly, referring to FIG. 8, a schematic constitution of an optical system 100 to which sensor systems according to embodiments described below is applicable will be described.

The optical system 100 includes a laser source 1 for emitting a laser beam, a collimating lens 2 which collimates the laser beam emitted by the laser source 1, an objective lens 3 which converges the collimated beam on a disc D to form a spot thereon. Further, the optical system 100 includes a beam splitter 4 which receives the reflected beam from the optical disc D and make the beam to proceed in a direction different from the optical path of the beam from the optical disc D to the beam splitter 4, and a sensor system SS which receives the beam reflected by the beam splitter 4 to detects a data signal, a focusing error signal and a tracking error signal. The sensor system SS is connected to a CPU (Central Processing Unit) 4 to which signals Sa, Sb, . . . received by a plurality of light receiving areas A, B, . . . of the sensor system SS are transmitted. The CPU 4 calculates the focusing error signal FE and the tracking error signal TE based on the received signals Sa, Sb, . . . . The focusing error signal FE and the tracking error signal TE are transmitted to a not shown driving circuit to adjust focusing and tracking conditions.

Optical discs are configured such that, in a cross section along the radial direction thereof (i.e., along a transversal direction of tracks thereof), grooves and lands are alternately formed. When data is read or written, the objective lens 3 is positioned such that the spot is formed at the center, in the radial direction of the disc, of the land.

Figure 8:
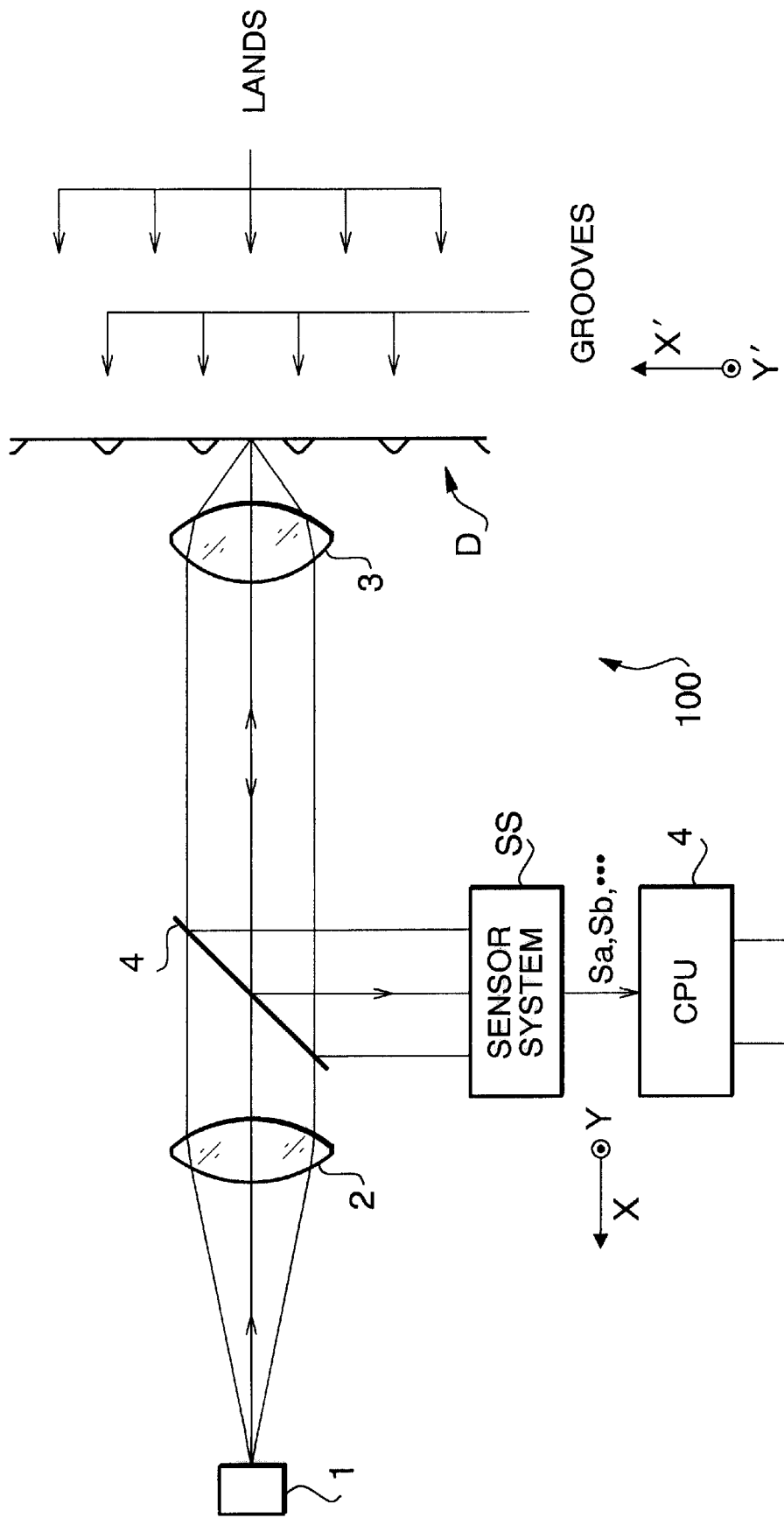
FIG. 8 shows a schematic constitution of an optical system of the optical disc drive.

In FIG. 8, the radial direction and the tangential direction on the optical disc D are indicated as X' and Y', which respectively correspond to the directions X and Y on the sensor system SS.

Next, specific sensor systems for the sensor system SS shown in FIG. 8 will be described in detail.

First Embodiment

Figure 9:
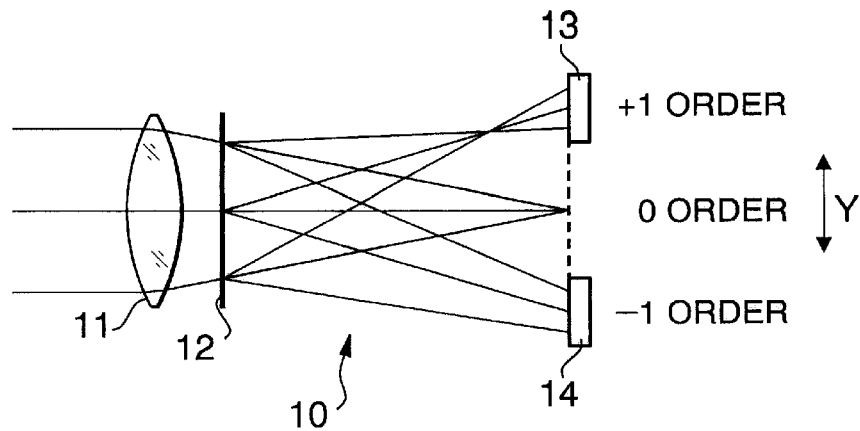
FIG. 9 shows a schematic constitution of a sensor system according to a first embodiment.

FIG. 9 shows a sensor system 10 according to a first embodiment of the invention. To perform the spot size detection method for obtaining the focusing error signal, the sensor system 10 is provided with a collective lens 11 for collecting light beam reflected by the optical disc D (see FIG. 8), and a hologram element 12 which splits the converging beam emerged from the collective lens 11 into at least +1st and −1st order diffraction light beams in the Y direction. Further, a first and a second sensors 13 and 14 respectively for receiving the +1st and −1st diffraction light beams are provided. The first and the second sensors 13 and 14 are arranged in the Y direction.

The hologram element 12 is formed to function as a positive lens for the +1st diffraction light beam, and as a negative lens for the −1st diffraction light beam. Thus, the +1st and −1st diffraction light beams converge at different positions in the direction of the optical axis of the collective lens 11 as well as in the Y direction. With respect to a plane which is perpendicular to the optical axis of the collective lens 11 and on which a 0 (zero) order light beam converges, the +1st order light beam is a front-focused condition, and the −1st order light beam is a rear-focused condition, both having certain defocus amounts as shown in FIG. 9. Distances from the first and the second sensors 13 and 14 to a principal plane of the collective lens 11 are the same. In particular, the first and the second sensors 13 and 14 are arranged on a plane which is perpendicular to the optical axis of the collective lens 11 and on which the 0th order light beam converges when the objective lens focuses on the disc D. Accordingly, the first sensor 13 is positioned farther from the collective lens 11 than the converging point of the +1st diffraction light beam, and the second sensor 14 is positioned closer to the collective lens 11 than the converging point of the −1st order diffraction light beam.

In the sensor system 10, the focusing error signal is detected with use of the spot size detection method, and further, the tracking error signal is detected with use of a push-pull method. An example of the spot size detection system is disclosed in U.S. Pat. No. 4,724,533, issued on Feb. 9, 1988, teachings of which are incorporated herein by reference in its entirety. An example of the push-pull method is, although the them "push-pull" is not used, disclosed in U.S. Pat. No. 4,998,235, issued on Mar. 5, 1991, teachings of which are incorporated herein by reference in its entirety.

Figure 10:
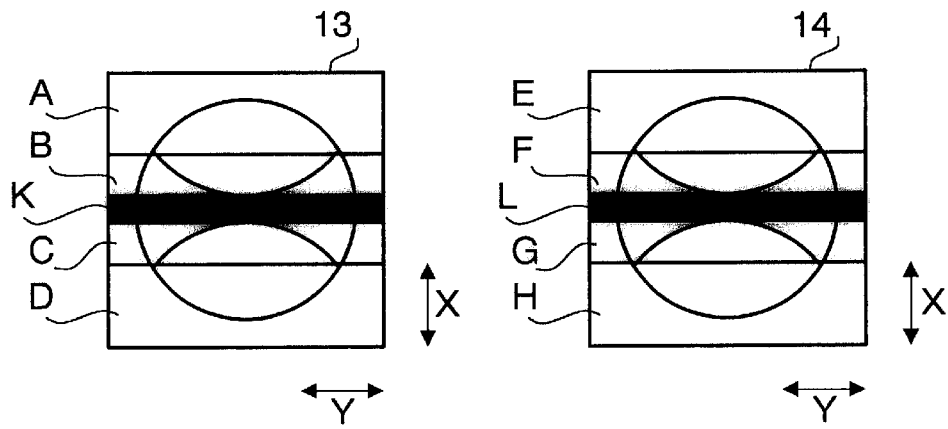
FIG. 10 shows a constitution of sensors of the sensor system shown in FIG. 9.

As described above, the hologram element 12 is formed to function to split an incident beam into the +1st and −1st order diffraction beams in the Y direction, and the first and the second sensors 13 and 14 are arranged to respectively receive the +1st and −1st order diffraction beams. Further, the first and second sensors 13 and 14 include light receiving areas A–D and E–H divided by boundaries extending in the Y direction, and non-sensitive areas K and L, respectively, as shown in FIG. 10.

A diffraction angle of the hologram element 12 varies depending on the wavelength of the incident beam. If the wavelength of the laser beam emitted by the laser source 1 changes, the spots on the first and the second sensors 13 and 14 displace in the Y direction. As shown in FIG. 10, since the boundaries of the light receiving areas are provided to extend in the Y direction, even if the wavelength of the laser beam changes and the spot positions are changed, signals output from respective areas will not be affected thereby, and accordingly, a noise component will not be added in the detection signals.

Figure 11:
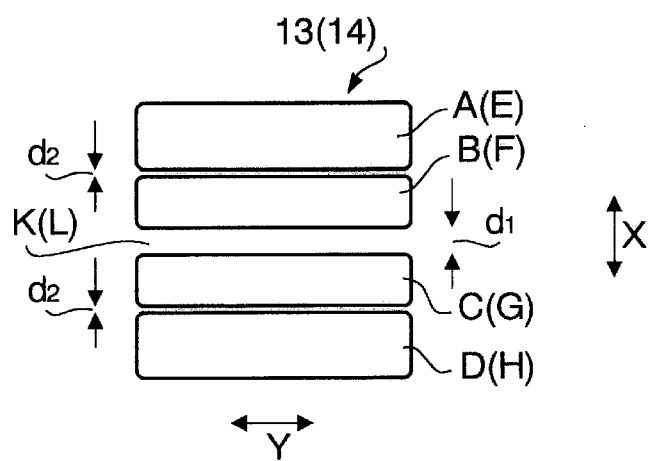
FIG. 11 shows an arrangement of light receiving areas of a sensor shown in FIG. 10.

As shown in FIG. 11, the light receiving areas A and B are spaced apart, in the X direction, by a distance d2, and so are the areas C and D. The width, in X direction, of the non-sensitive area K, which is formed to be non-sensitive to the incident light beam, is d1 which is greater than the distance d2. Further, the area K substantially coincides with the cross-talk area.

Similarly, the light receiving areas E and F are spaced apart by d2, and G and H are also spaced apart, in the X direction, by d2. The width, in X direction, of the non-sensitive area L, which substantially coincides with the cross-talk area, is d1 which is greater than the distance d2.

With this configuration, if signals output from the areas A–H are represented by Sa–Sh, respectively, the focusing error signal FE and the tracking error signal TE are represented by the equations below:

$$FE=(Sa+Sb)-(Sc+Sd)-(Se+Sf)+(Sg+Sh);$$

and $$TE=Sa-Sb-Sc+Sd-Se+Sf+Sg-Sh.$$

Figure 12:
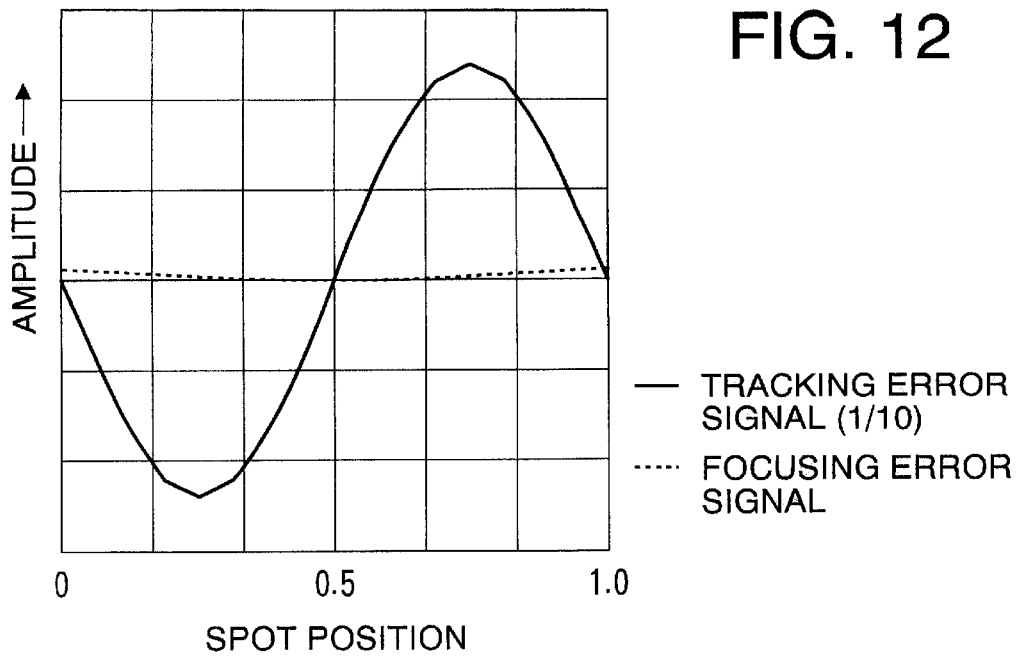
FIG. 12 is a graph showing a focusing error signal and a tracking error signal detected by the sensor system shown in FIG. 10 when a spot is moved from a land to another land on the optical disc.

FIG. 12 shows a graph indicating changes of the tracking error signal (solid line, 1/10 scale) and the focusing error signal (broken line) when the beam spot on the disc is moved from a center of a land (X'=0) to a next land (X'=1) using an objective lens whose NA (numerical aperture) is 0.6, a collective lens whose focal length is 27 mm, and the sensor system 10 shown in FIG. 10. A position at X'=0.5 represents a center of a groove formed between adjacent lands.

As shown in FIG. 12, regardless of the spot positions in the radial direction on the disc D, the focusing error signal remains substantially constant, i.e., the T/F cross-talk is effectively removed.

As described above, in the sensor system 10, the non-sensitive areas are formed on the first and second sensors at portions corresponding to the cross-talk areas, the T/F cross-talk can be removed effectively, and accordingly the focus error signal can be detected accurately.

It should be noted that, in the sensor system 10 described above, the hologram element is used for making the sensor system compact. If the compactness is not so important factor, the hologram element can be replaced with a half mirror and a side mirror. The half mirror is arranged to reflect a part of an incident beam to the side mirror. A part of the beam passed through the half mirror is incident to the first sensor, and the beam reflected by the half mirror to the side mirror is reflected by the side mirror to be incident on the second sensor. With this constitution, the first and the second sensors can be arranged on the same plane.

Second Embodiment

Figure 13:
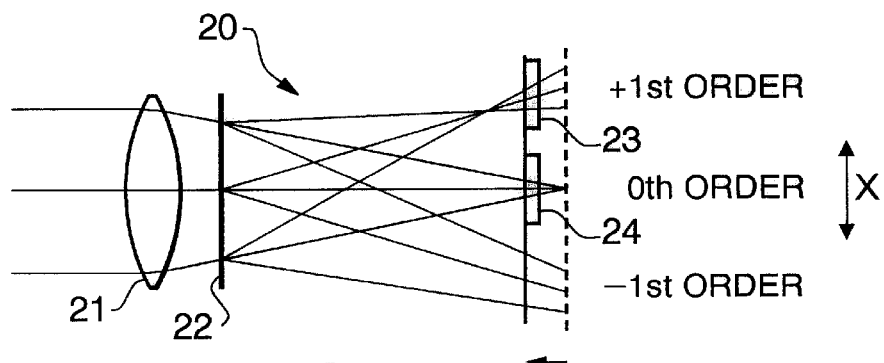
FIG. 13 shows a constitution of a sensor system according to a second embodiment of the invention.

FIG. 13 shows an arrangement of optical elements of a sensor system 20 according to a second embodiment of the invention. The sensor system 20 can be used as the sensor system SS of the optical system 100 shown in FIG. 8. In the second embodiment, with use of the 0th order light beam and the +n-th order (e.g., +1st order) diffraction light beam, the focusing error signal is detected in accordance with the spot size detection method, and, with use of only the 0th order light beam, the tracking error signal is detected in accordance with the push-pull method.

As shown in FIG. 13, the sensor system 20 is provided with a collective lens 21 for collecting and converging the light beam reflected by the optical disc D (see FIG. 8), a hologram element 22 which splits the converging beam emerged from the collective lens 21 into at least a 0th order light beam and a +1st order diffraction light beam in the X direction. Further, a first sensor 23 for receiving the 0th order diffraction light beam, and a second sensor 24 for receiving the +1st order diffraction light beam are provided.

It should be noted that, in FIG. 13, the collective lens 21, the hologram element 22, and the sensors 23 and 24 are arranged in this order from the light incident side. However, this order can be changed such that the hologram element 22 is located at the light incident side, and the collective lens 21, and the sensors 23 and 24 are arranged in this order from the light incident side.

The hologram element 22 is formed to have no power with respect to the 0th order light beam, and to function as a positive lens with respect to the +1st order diffraction light beam. The first and second sensors 23 and 24 are arranged at positions closer to the collective lens 21 with respect to the converging point of the 0th order light, i.e., the focal point of the collective lens 21, such that the spot size of the 0th order light beam formed on the first sensor 23 and the spot size of the +1st order diffraction light beam formed on the second sensor 24 are substantially the same when the objective lens 3 focuses on the disc D.

Specifically, as shown in FIG. 13, the first sensor 23 is located at a position closer to the collective lens 21 than the converging point of the 0th order light beam, and the second sensor 24 is located at a position farther from the collective lens 21 than the converging point of the +1st order diffraction light beam. In practice, the first and the second sensors 23 and 24 are on the same plane with satisfying the above condition so that a distance from the principal plane of the collective lens 21 to the first sensor 23, and a distance from the principal plane of the collective lens 11 to the second sensor 24 are substantially the same.

Figure 14:
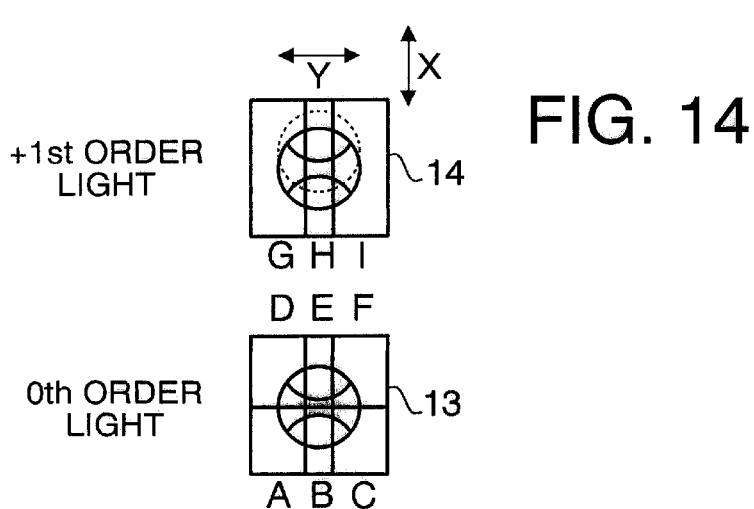
FIG. 14 shows a constitution of sensors employed in the sensor system shown in FIG. 13.

Also in the sensor system 20, the focusing error signal is detected with use of the spot size detection method, and the tracking error signal is detected with use of a push-pull method. For this purpose, the hologram element 22 is formed to function to split an incident beam into two beams in the direction X. Further, the first sensors 23 is constituted to have six light receiving areas A–F divided with two boundaries extending in the X direction and one boundary extending, at a center in the X direction, in the Y direction, as shown in FIG. 14. The second sensor 24 includes three light receiving areas G–I divided with two boundaries extending in the X direction.

A diffraction angle of the hologram element 22 varies depending on the wavelength of the incident beam. If the wavelength of the laser beam emitted by the laser source 1 changes, the spots on the first and the second sensors 23 and 14 displace in the X direction. As shown in FIG. 14, since the boundaries of the light receiving areas are provided to extend in the X direction, even if the wavelength of the laser beam changes and the spot positions are changed, a noise component will not be included in the detection signals. It should be noted that the 0th order light beam is actually not diffracted by the hologram element 22, and therefore, the position of the spot of the 0th order diffraction light beam is not displaced even if the wavelength changes.

As described above, the focus error signal is obtained based on the outputs of the first and second sensors 23 and 24, while the tracking error signal is detected based on the output of the first sensor 23. If signals output from the areas A–I are represented by Sa–Si, respectively, the focusing error signal FE and a tracking error signal TE are represented by the equations below:

$$FE=(Sa+Sd)-(Sb+Se)+(Sc+Sf)-Sg+Sh-Si;$$

and $$TE=(Sa+Sb+Sc)-(Sd+Se+Sf).$$

Figure 15:
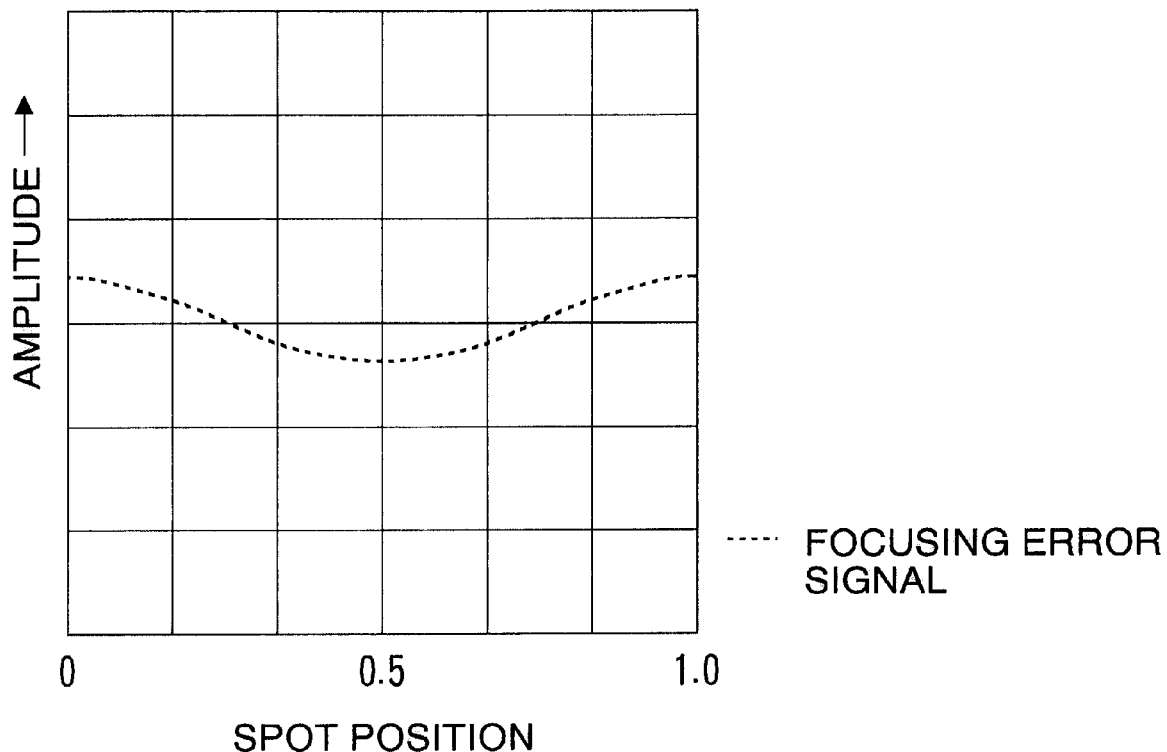
FIG. 15 is a graph showing a focusing error signal and detected by the sensor system shown in FIG. 13 when a spot is moved from a land to another land on the optical disc.

FIG. 15 shows a graph indicating changes the focusing error signal (broken line) when the beam spot on the disc is moved from a center of a land (X'=0) to a next land (X'=1) using an objective lens whose NA (numerical aperture) is 0.6, a converging lens whose focal length is 27 mm, and sensor systems 20 shown in FIG. 13. The position at X'=0.5 represents a center of a groove formed between the lands. As shown in FIG. 15, regardless of the spot position, in the radial direction X', on the disc D, change of the focusing error signal remains relatively small, i.e., the T/F cross-talk is effectively removed.

Third Embodiment

Figure 16:
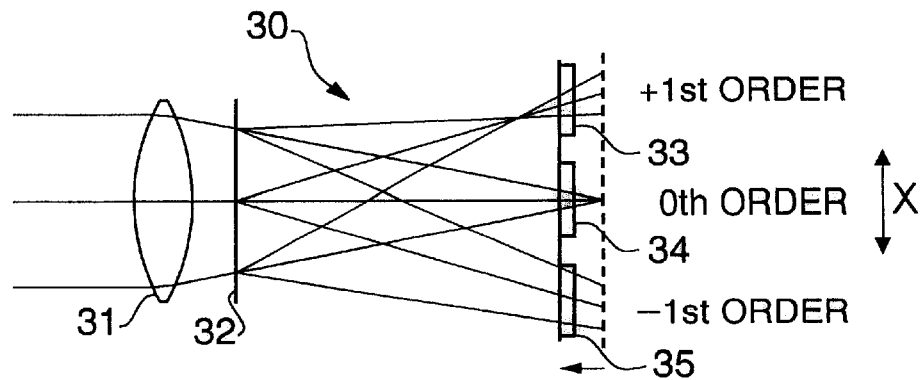
FIG. 16 shows a constitution of a sensor system according to a third embodiment of the invention.

FIG. 16 is a plan view of sensors of a sensor system 30 according to a third embodiment of the invention. In the third embodiment, with use of −1st order diffraction light beam and +1st order diffraction light beam, the focusing error signal is detected in accordance with the spot size detection method, and, with use of only the 0th order light beam, the tracking error signal is detected in accordance with the push-pull method.

The sensor system 30 includes a collective lens 31, a hologram element 32, a first sensor 33 and a second sensor 34, arrangement of which are similar to the arrangement of the collective lens 21, the hologram element 22, the first and second sensors 23 and 24 of the sensor system 20 shown in FIG. 13. In addition to the above, the sensor system 30 is provided with a third sensor 35 for receiving the −1st order diffraction light beam.

In the third embodiment, the hologram element 32 splits an incident beam into the 0th order, −1st order and +1st order diffraction light beams in the X direction. Further, the hologram element 32 is formed to function as a positive lens with respect to the +1st order diffraction light beam, and as a negative lens with respect to the −1st order diffraction light beam.

The first sensor 33 is arranged closer to the collective lens 11 than the converging point of the 0th order diffraction light beam, the second sensor 34 is arranged farther from the collective lens 11 than the converging point of the +1st order diffraction light beam, and the third sensor 35 is arranged closer to the collective lens 11 than the converging point of the −1st order diffraction light beam. In practice, the first, second and the third sensors 33, 34 and 35 are arranged on the same plane which is perpendicular to the optical axis of the collective lens 31 as shown in FIG. 16.

Figure 17:
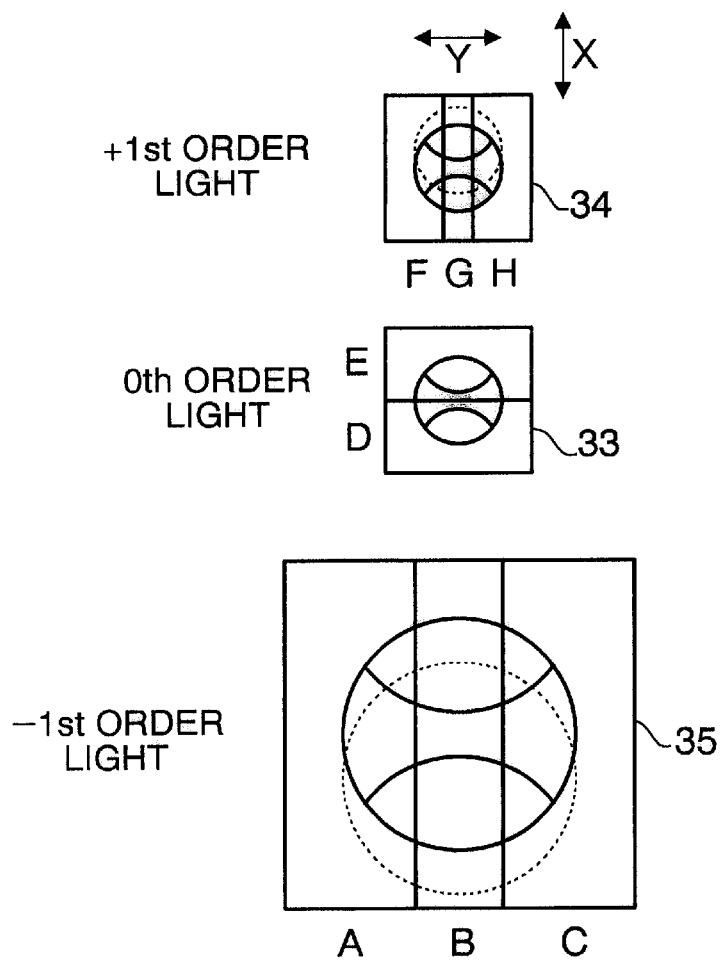
FIG. 17 shows a constitution of sensors employed in the sensor system shown in FIG. 16.

FIG. 17 shows a plan view of the first, second and third sensors 33, 34 and 35 of the sensor system 30. The first sensor 33 has two light receiving areas D and E divided by a boundary extending in the Y direction, at the center in the X direction. The second sensor 34 has three light receiving areas F, G and H divided by boundaries extending in the X direction. The size of the spots formed on the first sensor 33 and the second sensor 34 are substantially the same when the objective lens 3 focuses on the disc D. The third sensor 35 is positioned to have a greater defocus than the first and second sensors 33 and 34 so that the size of the spot formed thereon is greater than the that on the first and second sensors 33 and 34. Thus, the third sensor 35 is, as shown in FIG. 17, formed to be larger than the other sensors 33 and 34. The third sensor 35 has three light receiving areas A–C divided by boundaries extending in the X direction.

The focus error signal is obtained based on the outputs of the second and third sensors 34 and 35 in accordance with the spot size detection method, while the tracking error signal is detected based on the output of the first sensor 33 in accordance with the push-pull method. If signals output from the areas A–I are represented by Sa–Si, respectively, the focusing error signal FE and a tracking error signal TE are represented by the equations below:

$$FE=k(Sa-Sb+Sc)-Sf+Sg-Sh;$$

and $$TE=Sd-Se,$$

where, k represents a coefficient. Spot sizes of the −1st order diffraction light beam and +1st order diffraction light beam are different, and the sizes change at different ratios as the focusing condition changes. To cancel the difference, the coefficient k is multiplied.

As described above, according to the third embodiment, the focusing error signal which does not include the T/F cross-talk can be obtained in accordance with the spot size detection method, and further the tracking error signal can be obtained in accordance with the push-pull method. Further, even if the wavelength of the laser beam fluctuates and the positions of the spots on the second and the third sensors 34 and 35 change as indicated by broken lines, since the change occurs in the X direction, which does not affect the focusing error signal. Further, in the third embodiment, since the tracking error signal is detected based on the 0th order light beam, the change of the wavelength of the laser beam does not affect the tracking error signal.

Fourth Embodiment

Figure 18:
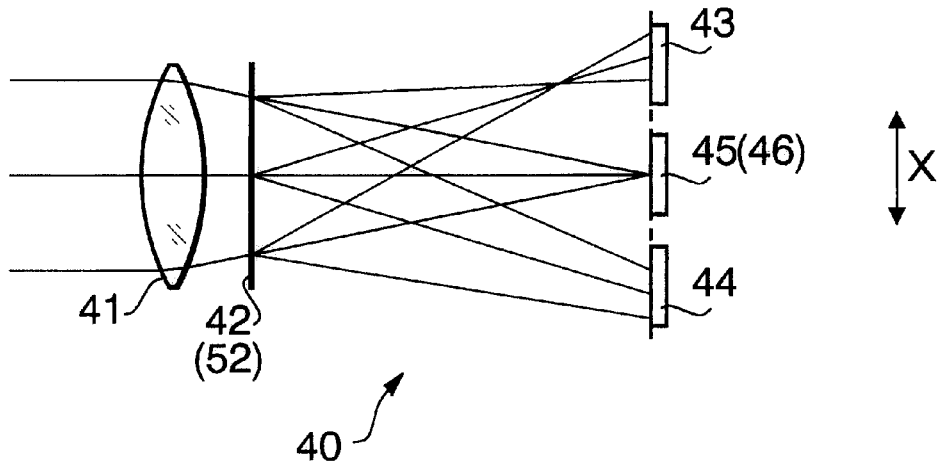
FIG. 18 shows a constitution of a sensor system according to a fourth embodiment of the invention.

FIG. 18 is a plan view of sensors of a sensor system 40 according to a fourth embodiment of the invention. The sensor system 40 can be used as the sensor system SS shown in FIG. 8.

Figure 19:
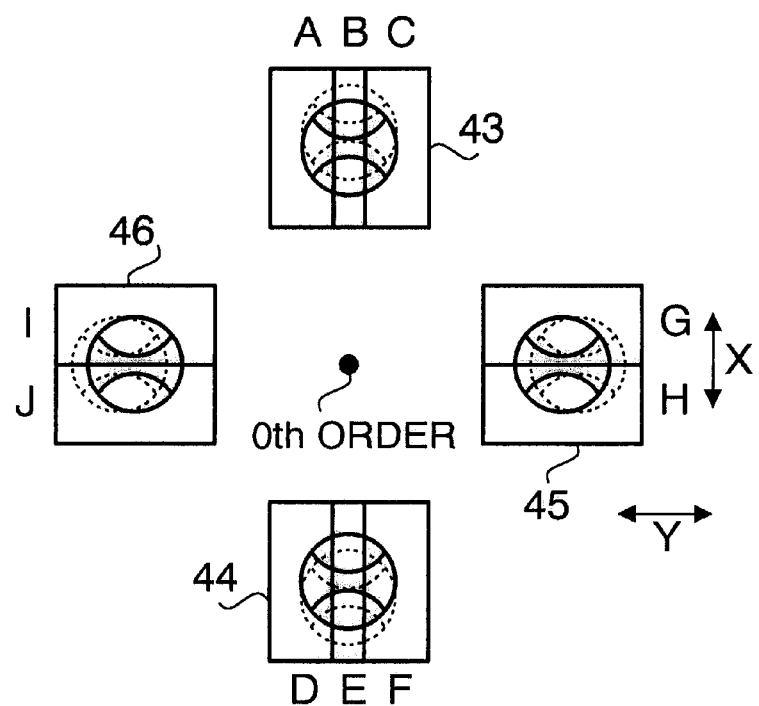
FIG. 19 shows a constitution of sensors employed in the sensor system shown in FIG. 18.

The sensor system 40 includes a collective lens 41, a hologram element 42 which divides the incident beam into four diffraction light beams, first through fourth sensors 43, 44, 45 and 46 for respectively receiving the four diffraction light beams as shown in FIGS. 18 and 19. The hologram element 42 can be replaced with a hologram element 52 which is a modification of the hologram element 42. A sensor system may employ the hologram element 52 instead of the hologram element 42. The modified hologram element 52 will be described later.

Firstly, with reference to FIGS. 20 and 21, hologram element 42 to be employed in the sensor system 40 will be described in detail.

Figure 20A:
FIGS. 20A and 20B show a first hologram and its function.

The hologram element 42 is regarded as a combination of a first hologram 42A and a second hologram 42B. FIG. 20A shows a first hologram 42A which divides an incident beam into three light beams, i.e., 0th order light beam, −1st order diffraction light beam, and +1st order diffraction light beam in the Y direction. The first hologram 42A functions as a negative lens for the +1st order diffraction light beam, and as a positive lens for the −1st order diffraction light beam.

Figure 20B:
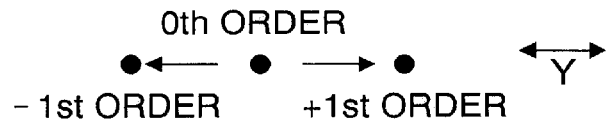

FIG. 20B shows spots of the 0th order light beam, and ±1st order diffraction light beams formed by a function of the first hologram 42A.

Figure 20C:
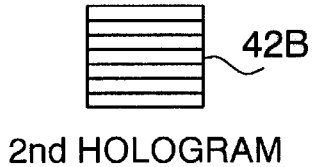
FIGS. 20C and 20D show a second hologram and its function.
Figure 20D:
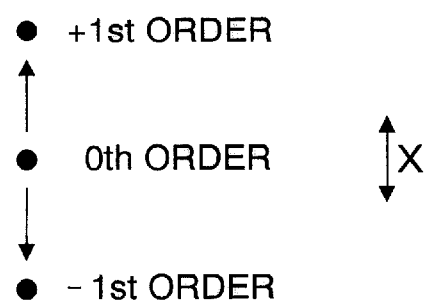

FIG. 20C shows the second hologram 42B which divides an incident beam into three diffraction light beams, i.e., 0th order diffraction light beam, −1st order diffraction light beam, and +1st order diffraction light beam in the X direction. The second hologram 42A functions as a positive lens for the +1st order diffraction light beam, and as a negative lens for the −1st order diffraction light beam. FIG. 20D shows spots of the 0th order light beam, and ±1st order diffraction light beams formed by a function of the second hologram 42B.

Figure 21A:
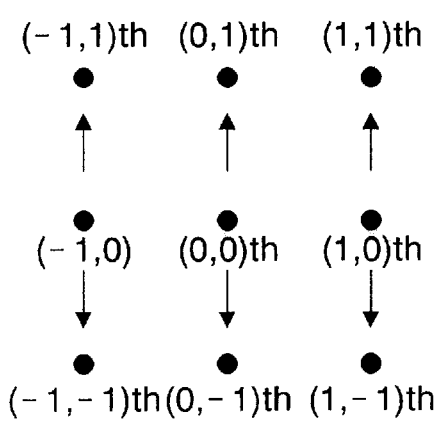
FIG. 21A shows a position of spots formed by beams divided by the hologram consisting of the first and second holograms shown in FIGS. 20A–20D.

A combination of the first and the second holograms 42A and 42B, i.e., the hologram element 42, has a function which is a combination of the function of the first hologram 42A shown in FIG. 20B and the function of the second hologram 42B shown in FIG. 20D. That is, the hologram element 42 divides an incident beam into nine light beams as shown in FIG. 21A. Each of the light beams divided, in the Y direction, by the function of the hologram 42A is divided into three light beams, in the X direction, by the function of the hologram 42B.

In the following description, diffraction order of each of the nine light beams is indicated as (a, b)-th order, wherein a is the diffraction order by the function of the first hologram 42A, and b is the diffraction order by the function of the second hologram 42B.

According to the above indication, the light beams divided by the function of the hologram element 42 are represented as (−1, 1)-th order, (−1, 0)-th order, (−1, −1)-th order, . . . , and (1, 1)-th order, as shown in FIG. 21A.

In order to detect the focusing error signal in accordance with the spot size detection method, two beams having defocus are to be received by the sensors for the focusing error signal. In the sensory system 40 shown in FIG. 18, the first sensor 43 and the second sensor 44 are used for detecting the focusing error signal. Accordingly, within the nine beams divided by the hologram element 42, two beams having defocus are to be received by the first and second sensors 43 and 44 in order to perform the spot size detection method. In FIG. 18, the two beams incident on the first and second sensors 43 and 44, and the (0, 0-)th order light beam are shown, and beams incident on the third and fourth sensors are not shown.

It should be noted that any of the two of the nine beams can be used for obtaining the focusing error signal, if the two beams have defocus. As an example, a case where the (−1, 1)-th order diffraction light beam and the (1, −1)-th order diffraction light beam are used is described.

Figure 21B:
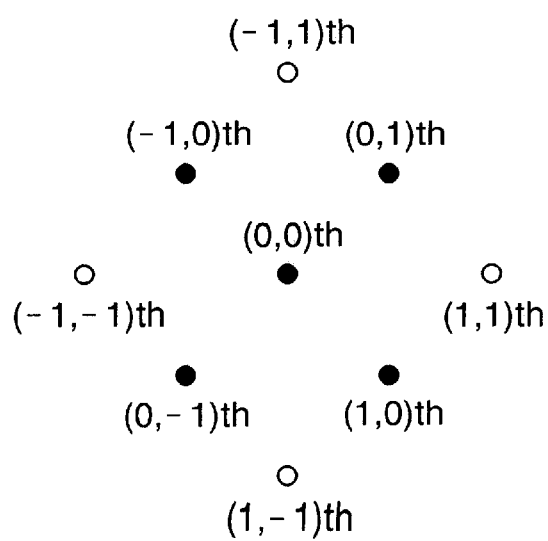
FIG. 21B shows a position of spots when the hologram is rotated by 45 degrees.

In this embodiment, the hologram element 42 is rotated such that the arrangement of the beams shown in FIG. 21A is rotated in clockwise direction by 45 degrees. FIG. 21B shows the rotated arrangement of the spots.

Firstly, the hologram element 42 is rotated such that an orientation of the beams arranged as shown in FIG. 21A is rotated in clockwise direction by 45 degrees as shown in FIG. 21B. In the arrangement shown in FIG. 21B, the (−1, 1)-th order diffraction light beam and the (1, −1)-th order diffraction light beam are arranged along the X direction, and the (1, 1)-th order diffraction light beam and the (−1, −1)-th order diffraction light beam are arranged along the Y direction. Since the sensors 43–46 are arranged as shown in FIG. 19, the (−1,1)-th order, (1, −1)-th order, (1, 1)-th order and (−1, −1)-th order diffraction light beams are received by the sensors 43–46 from among nine beams shown in FIG. 21B.

That is, the first sensor 43 receives the (−1, 1)-th order diffraction light beam, the second sensor 44 receives the (1, −1)-th order diffraction light beam, the third sensor 45 receives the (1, 1)-th order diffraction light beam, and the fourth sensor 46 receives the (−1, −1)-th order diffraction light beam.

As described above, the first hologram 42A functions as a negative lens for the +1st order diffraction light beam, and as a positive lens for the −1st order diffraction light beam, and further the second hologram 42B functions as a positive lens for the +1st order diffraction light beam, and as a negative lens for the −1st order diffraction light beam. Therefore, as shown in FIG. 18, the (1, 1)-th order diffraction light beam and (−1, −1)-th order diffraction light beam converge at points on opposite sides with respect to the converging point of the (0, 0)-th order light beam which is not affected by the function of the hologram element 42. Thus, if the first sensor 43 and the second sensor 44 are arranged on the same plane, and the plane is located at a position, along the optical axis, between the converging point of the (−1,1)-th order diffraction light beam and the converging point of the (1, −1)-th order diffraction light beam (e.g., on a plane on which the (0, 0)-th order light beam converges), the spot size detection method can be performed with use of the first and second sensors 43 and 44. If the hologram element 42 is constituted such that the (1, 1)-th order diffraction light beam and the (−1, −1)-th order diffraction light beam respectively converge at position apart from the plane on which the first and second sensors 43 and 44, it becomes possible to arrange the third and fourth sensors 45 and 46 on the same plane where the first and the second sensors 43 and 44 are arranged, and to detect the tracking error signal with use of the third and fourth sensors 45 and 46. Since the four sensors can be arranged on the same plane, it is possible to incorporated the four sensors in a single chip, or a small board. Accordingly, it becomes possible to make the sensor system 40 compact in size.

In the above example, the hologram element 42 is rotated such that the pattern shown in FIG. 21A is rotated in clockwise direction, as shown in FIG. 21B. However, it may be possible to rotate the hologram element 42 in a reverse direction, so that the (1, 1)-th order diffraction light beam and the (−1, 1)-th order diffraction light beam are arranged along the Y direction, and the (−1, 1)-th direction light beam and the (1, 1)-th order diffraction light beam are arranged in the X direction. In such a case, the first sensor 43 receives the (1, 1)-th order diffraction light beam, the second sensor 44 receives the (−1, −1)-th order diffraction light beam, the third sensor 45 receives the (1, −1)-th order diffraction light beam, and the fourth sensor 46 receives the (−1, 1)-th order diffraction light beam.

If the first hologram 42A and the second hologram 42B area constituted to provide defocus between the (1, 1)-th order diffraction light beam and (−1, 01)-th order diffraction light beam, the focusing error signal can be obtained with use of the first and second sensors 43 and 44, even when the first and second sensors 43 and 44 are arranged on the same plane. If the hologram element 42 is constituted such that the (1, −1)-th order diffraction light beam and the (−1, 1)-th order diffraction light beam respectively converge at position apart from the plane on which the first and second sensors 43 and 44 are arranged, it becomes possible to arrange the third and fourth sensors 45 and 46 on the same plane where the first and the second sensors 43 and 44 are arranged, and to detect the tracking error signal with use of the third and fourth sensors 45 and 46. Since the four sensors can be arranged on the same plane, it is possible to incorporated the four sensors in a single chip, or a small board. Accordingly, it becomes possible to make the sensor system 40 compact in size.

The first and the second sensors 43 and 44 respectively have three light receiving areas A–C, and D–F, which are divided by boundaries extending in the X direction as shown in FIG. 19.

Further, in order to detect the tracking error signal in accordance with the push-pull method, each of the third and fourth sensors 45 and 46 has two light receiving areas G and H, and I and J, which are divided by boundaries extending in the Y direction, at the center in the X direction.

A diffraction angle of the hologram element 42 varies depending on the wavelength of the incident beam. If the wavelength of the laser beam emitted by the laser source 1 changes, the spots on the first and the second sensors 43 and 44 are displaced in the X direction, and the spots on the third and the fourth sensors 45 and 46 are displaced in the Y direction. For example, if the wavelength becomes longer, the spot positions move to the positions indicated by broken lines in FIG. 19.

Since the cross-talk area CK extends in the Y direction which is perpendicular to the direction of the boundaries of the first and second sensors 43 and 44, all the light receiving areas include the cross-talk area. Accordingly, the T/F crosstalk does not affect the focusing error signal.

Since all the boundaries of the light receiving areas are provided to extend in the directions in which the spots move when the wavelength changes, even if the wavelength of the laser beam changes and the spot positions are changed, an amount of light received by each light receiving area is not changed, and therefore a noise component will not be included in the detection signals.

Accordingly, with use of the first sensor 43, the focusing error signal can be detected without being affected by the T/F cross-talk. Further, even if the spot positions are changed due to change of the wavelength, the direction of movement of the spots on the sensors coincides with the direction in which the boundaries extend the detected signal will not be affected thereby.

As described above, the first through fourth sensors 43–46 can be arranged on the same plane which is a plane perpendicular to the optical axis of the collective lens 41. Since the all the sensors can be arranged on the same plane, in practice, the sensors can be mounted on a single chip, which contributes to make the sensor system SS compact.

The focusing error signal FE and the tracking error signal TE are represented by the equations below:

$$FE = Sa - Sb + Sc - Sd + Se - Sf;$$

and $$TE = Sg - Sh - Si + Sj,$$

where, Sa–Sj respectively represent the signals output from the areas A–F.

As described above, with use of the hologram element 42, in the sensor system 40, the focusing error signal which does not include the T/F cross-talk can be obtained in accordance with the spot size detection method, and further the tracking error signal can be obtained in accordance with the push-pull method.

When the hologram element 42 is employed in the sensor system 40, however, since five diffraction light beams within the nine diffraction light beams are not used, energy efficiency is relatively low.

To improve the energy efficiency, it is advantageous to modify the hologram element 42 as follows.

Firstly, with reference to FIGS. 22A, 22B and 23, the modified hologram element 52 to be employed, as an alternative of the hologram element 42, in the sensor system 40 will be described in detail.

The hologram element 52 is also regarded as a combination of a first hologram 52A and a second hologram 52B. FIG. 22A shows a first hologram 52A which divides an incident beam into two light beams, i.e., −1st order diffraction light beam, and +1st order diffraction light beam in a first direction. FIG. 22B shows spots of the ±1st order diffraction light beams formed by a function of the first hologram 52A.

FIG. 22C shows the second hologram 52B which divides an incident beam into two diffraction light beams, i.e., a −1st order diffraction light beam, and a +1st order diffraction light beam in a second direction which is perpendicular to the first direction. FIG. 22D shows spots of the ±1st order diffraction light beams formed by a function of the second hologram 52B.

Thus, the hologram element 52, which is a combination of the first and second holograms 52A and 52B, divides an incident beam to four diffraction light beams, i.e., (1, 1)-th order, (1, −1)-th order, (−1, −1)-th order, and (−1, 1)-th order diffraction light beams can be obtained as shown in FIG. 23. In the drawings, "O" denotes presence of a diffraction light beam, and "×" denotes absence of a diffraction light beam.

In order to have the four diffraction beams shown in FIG. 23 received by the sensors 43–46 shown in FIG. 19, respectively, the four spots should be arranged as vertexes of a square, and an orientation of the square should be aligned.

For example, if the arrangement of the spots are as shown in FIG. 23, by rotating the hologram element 52 by 45 degrees, the (−1, 1)-th order diffraction light beam and the (1, −1)-th order diffraction light beam are arranged along the X direction, and the (1, 1)-th order diffraction light beam and the (−1, −1)-th order diffraction light beam are arranged along the Y direction, as shown in FIG. 24.

Then, similarly to the case where the hologram element 42 is used, the focusing error signal can be obtained with use of the first and second sensors 43 and 44, and the tracking error signal can be obtained with use of the third and fourth sensors 45 and 46.

A general condition to be satisfied by the hologram element 52 for detecting the focusing error signal in accordance with the spot size detection method, and the tracking error signal in accordance with the push-pull method based on the four diffraction light beams will be described.

Generally, it is expressed the first hologram 52A has a function F1, and the second hologram 52B has a function F2. If a combination of functions is indicated with a symbol "+", and elimination of a function from another is indicated with a symbol "−", the function of the hologram element 52 can be indicated as follows:

(a) for (1, 1)-th order diffraction beam: F1+F2;

(b) for (1, −1)-th order diffraction beam: F1−F2;

(c) for (−1, −1)-th order diffraction beam: −F1−F2; and (b) for (−1, 1)-th order diffraction beam: −F1+F2.

If the hologram element 52 is rotated such that the diffraction light beams are arranged as shown in FIG. 24, the (−1, 1)-th order diffraction beam and the (1, −1)-th order diffraction beam are received by the first and second sensors 43 and 44, respectively. In this case, in order to perform the spot size detection method, the combined function F1−F2 or −F1+F2 should have defocus. It should be noted that, since −F1+F2=−(F1−F2), if the function F1−F2 includes a function of providing defocus, −F1+F2 includes a function of providing defocus in the opposite direction. Accordingly, in this case, it is sufficient if the function F1−F2 include the function of providing defocus.

If the hologram element 52 is rotated such that the diffraction light beams shown in FIG. 24 is rotated in counterclockwise direction by 90 degrees, the (1, 1)-th order diffraction beam and the (−1, −1)-th order diffraction beam are received by the first and second sensors 43 and 44, respectively. In this case, in order to perform the spot size detection method, the combined function −F1−F2 or F1+F2 should have function to provide defocus. It should be noted that, since −F1−F2=−(F1+F2), if the function F1+F2 includes a function of providing defocus, −F1−F2 includes a function of providing defocus in the opposite direction. Accordingly, in this case, it is sufficient if the function F1+F2 includes the function of providing defocus.

For example, if the function F1 is a function of converting a plane wave into a cylindrical wave in the X direction (i.e., a spherical wave only in the X direction), the function F2 is a function of converting a plane wave into a cylindrical wave in the Y direction, and degree of conversion is the same, then the combined function F1+F2 is a function of converting a plane wave into a spherical wave, and the function F1−F2 is a function of providing astigmatism.

If, each of the functions F1 and F2 is a function of providing defocus (F1≠F2), then either of the function F1+F2 or F1−F2 is a function of providing defocus. The simplest configuration is that the function F1 provides defocus, and the function F2 is a function of a prism (i.e., a function of bending an optical path, a bending amount depending on the diffraction order of a beam).

In the above description, a case where the ±1st order diffraction beams are used is explained. Hereinafter, more generalized description will be provided.

Assuming that the first hologram 52A utilizes ±m-th order diffraction light beams and has a function F1, that the second hologram 52B utilizes ±n-th order diffraction light beams and has a function F2, then the hologram element 52.

(1) divides an incident light beam into (m, n)-th order, (m, −n)-th order, (−m, −n)-th order and (−m, n)-th order diffraction beams, and (2) has a function of:
  (a) mF1+nF2 with respect to the (m, n)-th order diffraction light beam;
  (b) mF1−nF2 with respect to the (m, −n)-th order diffraction light beam;
  (c) −mF1−nF2 with respect to the (−m, −n)-th order diffraction light beam; and
  (d) −mF1+nF2 with respect to the (−m, n)-th order diffraction light beam.

Figure 28A:
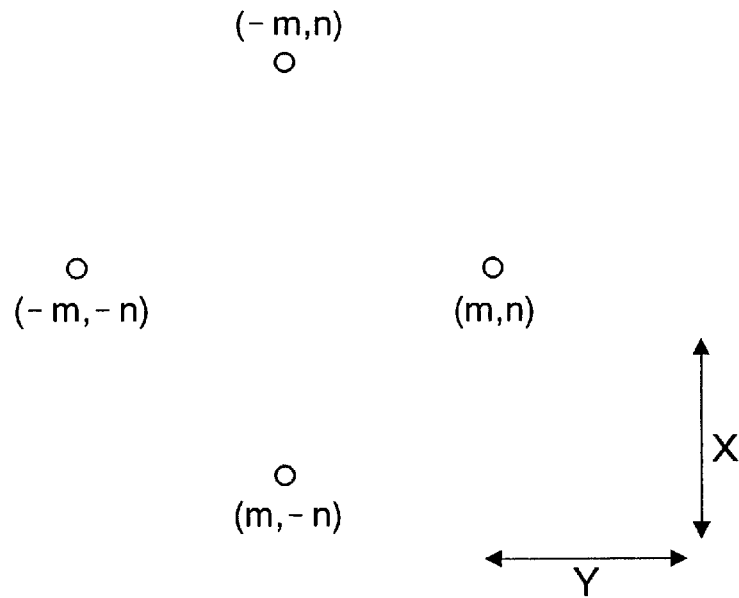
FIGS. 28A and 28B show arrangements of spots with respect different orientations of the hologram.
Figure 28B:
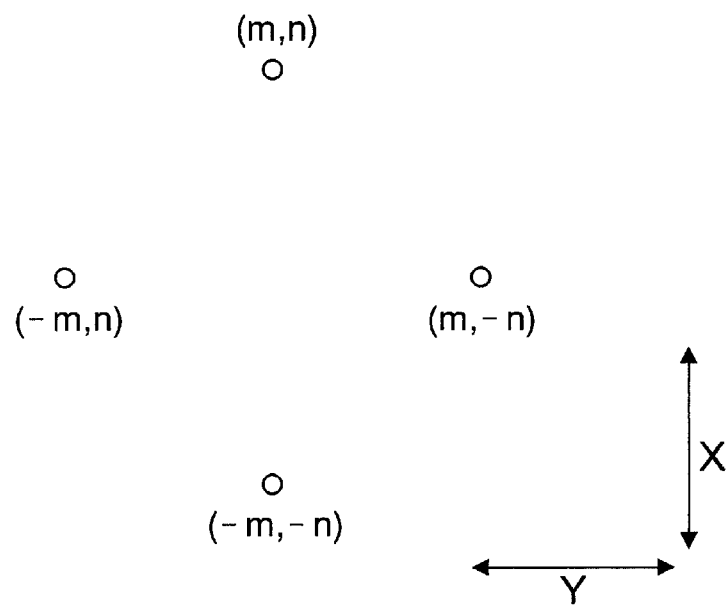

When the orientation of the hologram element 52 is changed such that the diffraction beams are arranged as show in FIG. 28A, if −mF1+nF2 or mF1−nF2 includes a function of providing defocus, the focusing error signal can be detected in accordance with the spot size detection method with use of the first and second sensors 43 and 44 shown in FIG. 19. Alternatively, When the orientation of the hologram element 52 is changed such that the diffraction beams are arranged as shown in FIG. 28B, if mF1+nF2 or −mF1−nF2 includes a function of providing a defocus, the focusing error signal can be detected in accordance with the spot size detection method with use of the first and second sensors 43 and 44 shown in FIG. 19.

In summary, if each of m and n is defined to be an integer not equal to zero, a condition to be satisfied can be expressed as follows:

$$Fc = mF1 + nF2,$$

where, Fc represents a function of providing a defocus.

In order to arrange the diffraction light beams as shown in FIG. 28A or 28B, the conditions below should be satisfied:

$$m|G1| = n|G2| \quad (1)$$

$$G2 \neq k \cdot G1 \quad (2)$$

where, G1 is a lattice vector of the first hologram 52A, G2 is a lattice vector of the second hologram 52B, m and n are integers representing diffraction orders of the beams to be used, and k is a real number.

When a hologram is regarded as a liner diffractive grating, a direction of the lattice vector is a direction perpendicular to a direction of the diffractive grating, and a value of the lattice vector is determined by a reciprocal of a pitch of the gratings (i.e., the number of gratings per unit).

Figure 25:
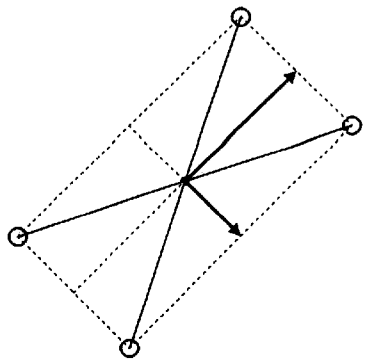
FIGS. 25–27 show relationships between an arrangement of spots and lattice vectors.

As shown in FIG. 25, if the diffraction orders of beams diffracted by the first and the second hologram 52A and 52B are same, and the values of the lattice vectors G1 and G2 are different, even if the lattice vectors are perpendicular to each other, the diffracted light beams are located at the vertexes of a rectangle, and diagonal liens, which represent the arranging direction of the diffraction light beams, are not perpendicular to each other. In this case, the hologram element 52 cannot be used in combination with the sensors shown in FIG. 19.

Figure 26:
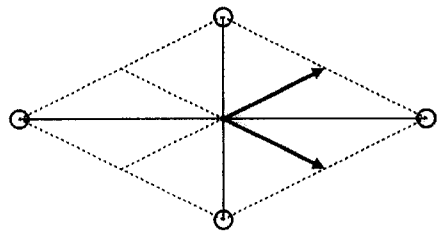

If the diffraction orders of a beam diffracted by the first and the second hologram 52A and 52B are the same, and the value of the grating vectors G1 and G2 are also the same, the diffracted light beams are located on the vertexes of a diamond shape as shown in FIG. 26, and diagonal lines, which represent the arranging direction of the diffraction light beams, are perpendicular to each other. Therefore, in this case, the hologram element 52 can be used in combination with the sensors 43–46 shown in FIG. 19. It should be noted that a case where the lattice vectors are parallel to each other should be excluded, which is defined by condition (2).

Figure 27:
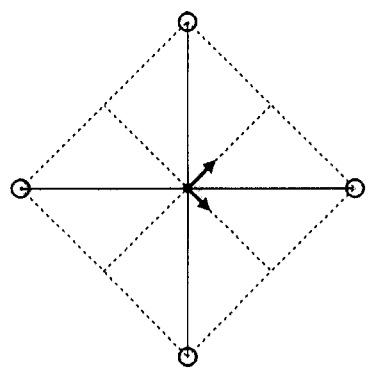

If the diffraction orders of the beams diffracted by the first and second holograms 52A and 52B are ±m-th order and ±n-th order, and when condition (1) is satisfied, the diffraction light beams are located, as shown in FIG. 27, at the vertexes of a square shape. Thus, the diagonal lines are perpendicular to each other even if the lattice vectors G1 and G2 are not perpendicular to each other, and the hologram elements can be used in combination with the sensors shown in FIG. 19.

According to the fourth embodiment and its modification, a hologram element, which is a combination of two holograms, is used and spots respectively formed by at least four diffraction light beams are arranged such that an arranging direction of two spots and another arranging direction of the other spots are perpendicular to each other. Thus, appropriate defocus information is given to each hologram element, the focusing error signal can be detected in accordance with the spot size detection method, and the tracking error signal can be detected in accordance with the push-pull method.

The present disclosure relates to subject matters contained in Japanese Patent Application Nos. HEI 09-211370, HEI 09-211371, and HEI 09-211372, filed on Jul. 22, 1997, and HEI 10-205621, filed on Jul. 21, 1998, which are expressly incorporated herein by reference in their entireties.

What is claimed is:

1. A sensor system for an optical disc drive, comprising:

a collective lens that receives and converges a light beam reflected by an optical disc;

a beam splitting element that divides said light beam received and emerged by said collective lens into at least two beams in a first direction, said first direction corresponding to a direction tangential to a track of said optical disc at a position where said light beam is reflected;

a first sensor provided to receive one of said at least two beams, said first sensor being arranged at a position farther from said collective lens than a converging point of said one of at least two beams, said first sensor having a plurality of light receiving areas and a non-sensitive area extending in said first direction at a central portion in a second direction which is perpendicular to said first direction, said second direction corresponding to a radial direction of said optical disc at a position where said light beam is reflected;

a second sensor provided to receive another of said at least two beams, said first sensor being arranged at a position closer to said collective lens than a converging point of said another of at least two beams, said second sensor having a plurality of light receiving areas and a non-sensitive area extending in said first direction at a central portion in a second direction which is perpendicular to said first direction, wherein, a focusing error signal is generated, based on output signals of each of light receiving areas of said first and second sensors, in accordance with a difference of sizes of spots formed on said first and second sensors.

2. The sensor system according to claim 1, wherein a width of each of said non-sensitive areas in said second direction is greater than a distance in said second direction of adjacent light receiving areas.

3. The sensor system according to claim 1, wherein a width, in said second direction, of said non-sensitive area of each of said first and second sensors substantially coincides with a width, in said second direction, of a cross-talk area at which relationship of brightnesses on said first and second sensors change when a beam spot formed on said optical disc moves in a transverse direction of tracks of said optical disc when there is no focusing error.

4. The sensor system according to claim 1, wherein boundaries of said plurality of light receiving areas of each of said first and second sensors extend in said first direction.

5. The sensor system according to claim 1, wherein a tracking error signal is generated based on a difference between signals of light receiving areas on both sides of said non-sensitive area.

6. The sensor system according to claim 1, wherein each of said first and second sensors includes two light receiving areas on either side of said non-sensitive area.

7. The sensor system according to claim 1, wherein said beam splitter comprises a hologram element which divides an incident beam into ±n-th order diffraction light beams, said hologram element having one of positive and negative power for said +n-th order diffraction light beam and having the other of positive and negative power for said −n-th order diffraction light beam.

8. The sensor system according to claim 7, wherein said hologram element divides an incident beam into ±1st order diffraction light beams.

9. A sensor system for an optical disc drive, comprising:

a collective lens that receives and converges a light beam reflected by an optical disc;

a hologram element that divides a light beam emerged by said collective lens into at least a 0th order diffraction light beam and an n-th (n≠0) order diffraction light beam in a second direction, said hologram element having a predetermined power with respect to said n-th order diffraction light beam, said second direction corresponding to a radial direction of said disc at a point where said light beam is reflected;

a first sensor provided to receive said 0th order diffraction light beam at a position apart from a converging point of said 0th order diffraction light beam, said first sensor having a plurality of light receiving areas which are divided by one boundary extending in a first direction, which is perpendicular to said second direction, at a center in said second direction and by at least two boundaries extending in said second direction, said first direction corresponding to a direction tangential to a track of said optical disc at a point where said light beam is reflected;

a second sensor provided to receive said n-th order diffraction light beam at a position apart from a converging point of said n-th order diffraction light beam, said second sensor having a plurality of light receiving areas which are divided by at least two boundaries extending in said second direction; and a signal detection system which generates:
(a) a focusing error signal based on output signals of each of light receiving areas of said first and second sensors, in accordance with a spot size detection method; and
(b) a tracking error signal based on output signal of said light receiving areas of said first sensor, in accordance with a push-pull method.

10. The sensor system according to claim 9, wherein said first sensor is arranged at a position closer to said collective lens than said converging point of said 0th order diffraction light beam, and wherein said second sensor is arranged at a position farther from said collective lens than a converging point of said n-th order diffraction light beam.

11. The sensor system according to claim 10, wherein said first and second sensors are apart from a principal plane of said collective lens by the same distance.

12. The sensor system according to claim 9, wherein said hologram element divides an incident beam into said 0th order diffraction light beam and +1st order diffraction light beam, said second sensor being positioned to receive said +1st order diffraction light beam.

13. A sensor system for an optical disc drive, comprising:

a collective lens that receives and converges a light beam reflected by an optical disc;

a hologram element that divides a light beam emerged from said collective lens into at least a 0th order diffraction light beam and a ±n-th (n≠0) order diffraction light beams in a second direction corresponding to a radial direction of said disc at a point where said light beam is reflected, said hologram element having different powers with respect to said ±n-th order diffraction light beams;

a first sensor provided to receive said 0th order diffraction light beam at a position apart from a converging point of said 0th order light beam, said first sensor having a plurality of light receiving areas which are divided, at a center in said second direction, by one boundary extending in a first direction corresponding to a direction tangential to a track of said disc at a point where said light beam is reflected;

a second sensor provided to receive said +n-th order diffraction light beam at a position farther from said collective lens than a converging point of said +n-th order diffraction light beam, said second sensor having a plurality of light receiving areas which are divided by at least two boundaries extending in said second direction;

a third sensor provided to receive said −n-th order diffraction light beam at a position closer to said collective lens than a converging point of said −n-th order diffraction light beam, said third sensor having a plurality of light receiving areas which are divided by at least two boundaries extending in said second direction; and a signal detection system that generates:
(a) a focusing error signal based on output signals of each of light receiving areas of said second and third sensors, in accordance with a spot size detection method, and
(b) a tracking error signal based on output signals of said light receiving areas of said first sensor, in accordance with a push-pull method.

14. The sensor system according to claim 13, wherein said first sensor is located at a position closer to said collective lens than the converging point of said 0th order diffraction light beam.

15. The sensor system according to claim 14, wherein distances from a principal plane of said collective lens to said first, second and third sensors are substantially the same.

16. The sensor system according to claim 14, wherein said hologram is formed to generate 0th and ±1st order diffraction light beams, said second sensor being arranged to receive said +1st order diffraction light beam, and said third sensor being arranged to receive said −1st order diffraction light beam.

17. A hologram element for sensor system of an optical disc drive, said hologram element comprising:

a first hologram which has a first function (F1), said first function (F1) including a function of dividing an incident beam into a plurality of beams in a first direction; and a second hologram which has a second function (F2), said second function (F2) including a function of dividing an incident beam into a plurality of beams in a second direction which is different from said first direction, said first and second hologram satisfying a condition:

$$Fc = m \cdot F1 + n \cdot F2,$$

where Fc represents a function of providing a defocus, m and n are integers.

18. The hologram element according to claim 17, which satisfies a condition:

$$m|G1| = n|G2|;$$

and $$G2 \neq k \cdot G1,$$

wherein, G1 represents a lattice vector of said first hologram, G2 represents a lattice vector of said second hologram, and k represents a real number.

19. The hologram element according to claim 18, wherein said first hologram mainly generates ±m-th order diffraction light beams, and wherein said second hologram mainly generates ±n-th order diffraction light beams.

20. The hologram element according to claim 18, wherein m and n respectively equal to 1 (one).

* * * * *